United States Patent
Okorogu

(10) Patent No.: US 6,487,022 B1
(45) Date of Patent: Nov. 26, 2002

(54) TRANSMITTER USING UNIFORM INTENSITY TRANSMISSION FOR A WIRELESS OPTICAL COMMUNICATION SYSTEM

(75) Inventor: Albert O. Okorogu, Redmond, WA (US)

(73) Assignee: Terabeam Corporation, Kirkland, WA (US)

( * ) Notice: Subject to any disclaimer, the term of this patent is extended or adjusted under 35 U.S.C. 154(b) by 0 days.

(21) Appl. No.: 09/938,896

(22) Filed: Aug. 24, 2001

(51) Int. Cl.[7] ............................................. G02B 11/00
(52) U.S. Cl. ........................................ 359/642; 359/641
(58) Field of Search ................................. 359/641, 642; 385/33, 43, 74; 372/101, 9, 69

(56) References Cited

U.S. PATENT DOCUMENTS

| | | | | |
|---|---|---|---|---|
| 4,530,564 A | * | 7/1985 | Scifres et al. | 359/641 |
| 5,237,451 A | * | 8/1993 | Saxe | 359/565 |
| 5,386,426 A | * | 1/1995 | Stephens | 372/20 |
| 5,701,373 A | * | 12/1997 | Oleskevich | 385/33 |
| 6,088,170 A | * | 7/2000 | Lee et al. | 359/710 |
| 6,128,134 A | * | 10/2000 | Feldman et al. | 359/641 |
| 6,339,504 B1 | * | 1/2002 | Oliva | 359/641 |

* cited by examiner

*Primary Examiner*—Georgia Epps
*Assistant Examiner*—M. Hasan
(74) *Attorney, Agent, or Firm*—Blakely Sokoloff Taylor & Zafman LLP

(57) ABSTRACT

A device that controls and reshapes optical signals generated by a laser or sent through fiber optic cables for eventual broadcast to various sectors. The optical train transforms the input Gaussian beam into a flat-top beam, a beam with a uniform intensity distribution. The device can operate either in a super broadband sector spectral output mode, which is a combination of independent orders of diffraction, or be extended to operate as a multi-beam system, where spatially separated beams are obtained at the output of the transmitter. In accordance with aspects of the present invention, both the point-to-sector and multi-beam schemes can be obtained from a single source.

30 Claims, 6 Drawing Sheets

$$\phi(x) \approx \left(\frac{2\pi u_O}{\lambda z}\right)\left(\frac{1}{erf\left(\sqrt{2}\,u_O/w_{Ox}\right)}\right)\left\{xerf\left[\sqrt{2}\,x/w_O\right] + \frac{w_{Ox}}{\sqrt{2\pi}}\left[\exp\left(\frac{2x^2}{w_{Ox}}\right) - 1\right]\right\} - \frac{\pi x^2}{\lambda z}$$

TRANSMITTER USING UNIFORM INTENSITY TRANSMISSION FOR A WIRELESS OPTICAL COMMUNICATION SYSTEM

TECHNICAL FIELD

This disclosure relates generally to optical signals, and in particular but not exclusively, relates to optical signals for free space optical communication systems.

BACKGROUND

Current laser transmitters in free space laser communication systems are limited to point-to-point broadcast systems. These point-to-point broadcast systems have pointing, tracking, and alignment issues.

Different developmental efforts aimed at increasing the performance of laser transmitters have emerged. The drawback with the various transmitters developed is that they are employed only in point-to-point broadcast.

Some researchers have used several discrete lasers and fiber links to connect multiple customers. Others have utilized tunable lasers that cannot operate simultaneously at different wavelengths. The problem with these schemes is that the system becomes bulky, expensive, and difficult to maintain. Besides, the basic challenges of point-to-point broadcast remain unsolved.

One of these challenges is the non-uniform intensity of the beam with its Gaussian distribution. The problem with the non-uniform intensity of the Gaussian beam is that it can cause signal loss to receivers not placed within the peak area of the beam. Stated in another way, receivers that receive the portion of the optical signals having the lower intensity along the fringes of the Gaussian distribution are more likely to experience signal loss or errors, as compared to receivers that receive the portion of the optical signal near the center or highest intensity of the Gaussian distribution.

SUMMARY

One aspect of the invention includes creating a uniform intensity flat-top beam from a non-uniform intensity optical beam, and canceling a divergence and correcting a phase of the uniform intensity flat-top beam that is created.

BRIEF DESCRIPTION OF THE DRAWINGS

Non-limiting and non-exhaustive embodiments of the present invention are described with reference to the following figures, wherein like reference numerals refer to like parts throughout the various views unless otherwise specified.

DETAILED DESCRIPTION OF THE ILLUSTRATED EMBODIMENTS

Embodiments of a system and method that use uniform intensity optical signals in free space optical communication systems are described herein. In the following description, numerous specific details are set forth to provide a thorough understanding of embodiments of the invention. One skilled in the relevant art will recognize, however, that the invention can be practiced without one or more of the specific details, or with other methods, components, materials, etc. In other instances, well-known structures, materials, or operations are not shown or described in detail to avoid obscuring aspects of the invention.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

As an overview an embodiment of the invention includes a device that controls and reshapes optical signals generated by a laser or sent through fiber optic cables for eventual broadcast to various sectors. The optical train transforms the input Gaussian beam into a flat-top beam, a beam with a uniform intensity distribution. The device can operate either in a super broadband sector spectral output mode, which is a combination of independent orders of diffraction, or be extended to operate as a multi-beam system, where spatially separated beams are obtained at the output of the transmitter. In accordance with aspects of the present invention, both the point-to-sector and multi-beam schemes are obtainable from a single source.

Figure 1A:
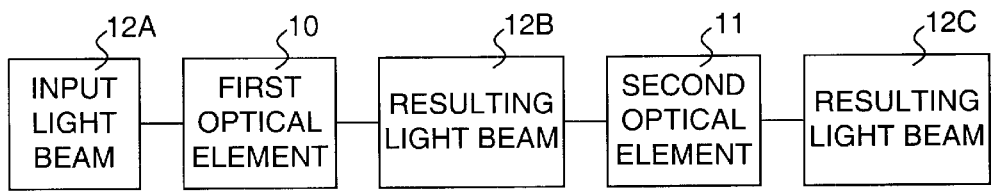
FIG. 1A is a block diagram illustrating a uniform intensity flat-top beam generator according to one embodiment of the present invention.
Figure 1B:
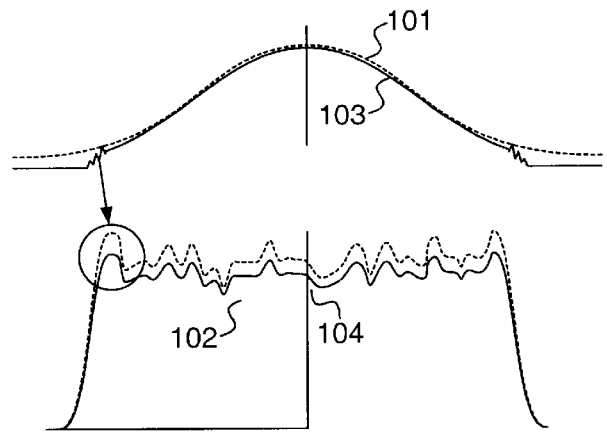
FIG. 1B illustrates a difference in intensity between a Gaussian beam and a flat-top beam.

FIG. 1A is a block diagram illustrating a uniform flat-top beam generator according to one embodiment of the present invention. The uniform flat-top beam generator comprises a first optical element 10 and a second optical element 11. The difference in intensity between a Gaussian beam 101 and a uniform intensity flat-top beam 102 is illustrated in FIG. 1B. The Gaussian beam 101 has a peak that slopes down on both sides 103 whereas the flat-top beam has a uniform distribution across the entire width of the beam 104, with some possible fluctuations as shown.

Returning to FIG. 1A, in one embodiment, the first optical element 10 is placed in the path of a Gaussian optical beam 101 (FIG. 1B) to be transformed into a uniform intensity flat-top beam 102 (FIG. 1B). The second optical element 11 is placed in the path of the optical beam after it passes through the first optical element 10.

Figures 1C, 1D:
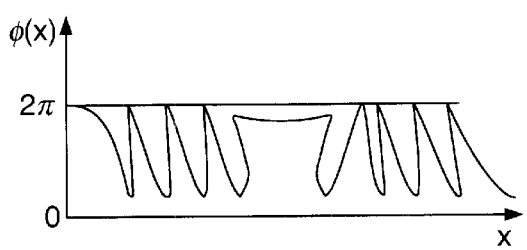
FIG. 1C is a phase modulo function formula in one dimension used to generate the uniform intensity flat-top beams according to one embodiment of the present invention.
FIG. 1D is a graph of the phase modulo function formula of FIG. 1C.

In one embodiment, the first optical element 10 and the second optical element 11 comprise diffractive optical elements (DOEs), such as diffractive glass lenses, or holographic glass lenses. In order to create the uniform intensity flat-top beam 102, the lenses can be etched using a particular phase function formula. The phase function can be given by a formula seen in FIG. 1C in one embodiment. The phase modulo $\phi(x)$ from the formula (FIG. 1C) is depicted in one dimension in FIG. 1D. Using custom manufacturing techniques, both lenses can be created so that the pattern scratched into the glass matches this particular phase function. Surfaces of the optical elements 10, 11 (FIG. 1A) are determined by this surface profile of the phase modulo. The thickness of the lens 10, 11 (FIG. 1A) can be given, in one embodiment, by the formula:

$$t=[\lambda/(2\pi \Delta n)]\phi(x)$$

Returning again to FIG. 1A, in one embodiment, the first optical element 10 can be a lens etched to conform to the desired phase modulo formula. The second optical element 11 can also be a lens etched to the same specification.

The first optical element 10 is placed in the path of an optical beam 12a, with the etched side facing the optical beam 12a. When the beam passes through the first optical element 10, the beam is transformed into a uniform flat-top beam 12b. By passing through the first optical element 10, the resulting flat-top beam 12b has diverged and is out of phase with the original optical beam 12a. The second optical element 11 is placed after the first optical element 10, except that it is placed backward—with the etched side facing the opposite direction and upside down with respect to the first optical element 10. When the flat-top beam 12b passes through the second optical element 11, the divergence is canceled and the phase is corrected to match the original optical beam 12a.

Figure 2:
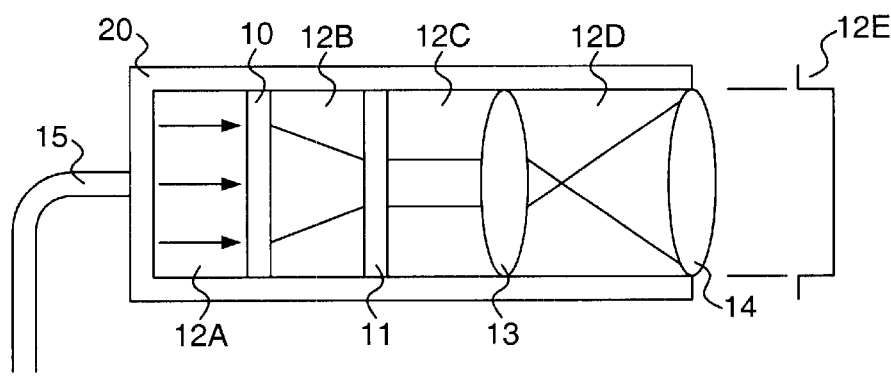
FIG. 2 illustrates a schematic diagram of a Transformer Optical Module (TOM) according to one embodiment of the present invention.

FIG. 2 is illustrates a schematic diagram of one embodiment of the present invention: a point-to-sector transmitter in a Transformer Optical Module (TOM). The TOM comprises a housing 20 that encases the optical signal 12a, the first optical element 10, the second optical element 11, a third optical element 13 and a collimating lens 14.

The optical signal 12a enters the TOM housing 20 from a fiber interface 15. After entering the TOM housing 20, the optical signal 12a passes through the first optical element 10. After passing through the first optical element 10, the optical signal 12b then passes through the second optical element 11. After passing through the second optical element 11 the optical signal 12c continues and passes through the third optical element 13, such as, for example, lenses, Dammann gratings, diffractive optic elements, or other optical components. An optical signal 12d, after passing through the third optical element 13, passes through the collimating lens 14 and is then transmitted as a collimated uniform intensity flat-top signal 12e.

In operation, the Gaussian beam 12a is inputted by the fiber interface 15. The TOM converts the Gaussian beam from the fiber interface 15 into a collimated flat top with uniform intensity 12e. The first and second optical elements 10, 11 perform the same function as described above. The first optical element 10 transforms the Gaussian beam 12a into a uniform intensity flat-top beam 12b. The second optical element 11 cancels the divergence and corrects the phase of the uniform intensity flat-top optical beam 12b. Both the first and second optical elements 10, 11 can be etched using the formula given in FIG. 1C. The second optical element 11 is placed backwards and upside down in relation to the first optical element 10 so that the divergence and phase are corrected. The corrected beam 12c then feeds into a lens 13, which expands the corrected beam 12c. The expanded beam 12d then feeds into the collimating lens 14, which then transmits the collimated uniform intensity flat-top beam 12e and adjusts the exit beam divergence for any sector.

Figure 3:
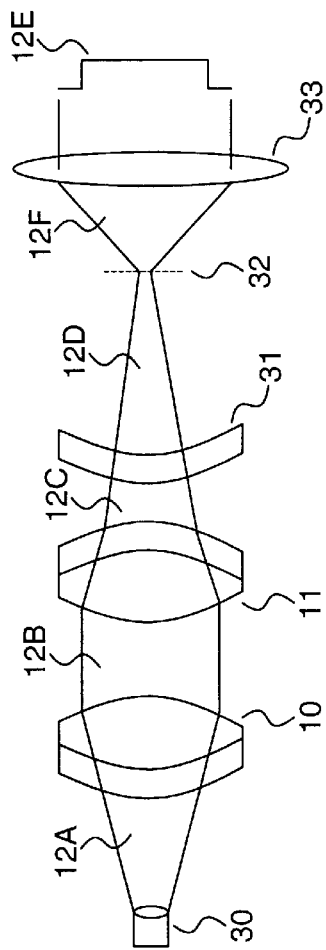
FIG. 3 is a block diagram illustrating a point-to-sector transmitter according to one embodiment of the present invention.

FIG. 3 illustrates a schematic diagram of a point-to-sector transmitter according to one embodiment of the present invention. Like FIG. 2, the point-to-sector transmitter includes a light source, a first optical element, a second optical element, a third optical element, a DOE, and a spherical lens.

In one embodiment, the light source is provided via an erbium doped fiber amplifier (EDFA) 30. A light beam from the EDFA 30 passes into the first optical element 10, and from the first optical element 10, the light beam passes into the second optical element 11. The first and second optical elements 10, 11 can be identical achromatic doublet lenses. The light beam, after passing through the second optical element 11, feeds into the third optical element 31, which can be an aplanatic meniscus lens in one embodiment to correct for aberrations. The light beam after passing through the third optical element 31, feeds into a 1×3 DOE 32 that splits this incident beam into three beams in one embodiment (e.g., a zeroth and ±1st orders). After passing through the DOE 32, the light beams feed into the spherical lens 33 and are then transmitted, with the spherical lens 33 adjusting separation between the beams before transmission.

The EDFA 30 generates a beam 12a with an intensity that has the Gaussian distribution, with most of the intensity contained within the zeroth order diffraction and an equal amount of intensities going into opposite diffraction orders. The light beam 12a from the EDFA 30 first feeds into the pair of identical achromatic doublet lenses 10, 11 in one embodiment. The second achromatic doublet lens 11 is placed backward with respect to the first achromatic doublet lens 10. The lenses 10 and 11 and an aplanatic meniscus lens 31 operate to provide collimation and divergence compensation in one embodiment. The resulting beam 12d then disperses into N diffraction orders by passing through the DOE 32. The DOE 32 can be placed within the confocal distance of first input lenses 10, 11, 31. The DOE 32 may be a column or row grating vector or an N×N transmission grating. The dispersed light beam 12f from the DOE 32 feeds into the output spherical lens 33 and then collimated, and the near uniform intensity flat-top beam 12e, which is a superposition of the different diffraction beams in one embodiment, is transmitted into the far-field.

Figure 4A:
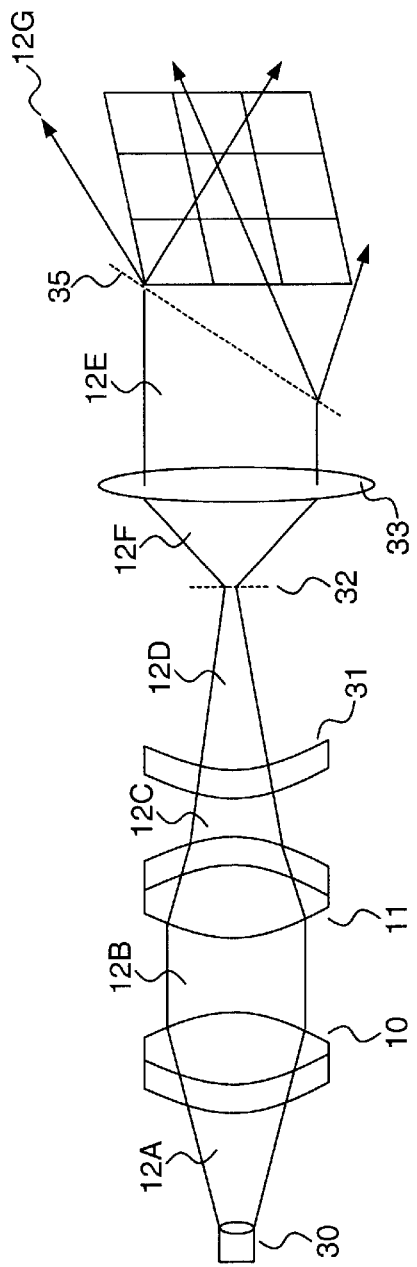
FIG. 4A is a block diagram illustrating a multi-array transmitter (MAT) of flat-top intensity beam elements according to another embodiment of the present invention.

FIG. 4A illustrates a multiple-array transmitter (MAT), in a fixed configuration where a distance between a receiver (sometimes referred to as a customer premise equipment or CPE) and the transmitter is fixed, according to another embodiment of the present invention. FIG. 4A includes all of the components of FIG. 3 in that it contains an EDFA 30, a pair of identical achromatic doublets lens 10,11, an aplanatic meniscus lens 31, a DOE 32, and a collimating output spherical lens 33, which perform the same operations as described above, but adds a fourth optical element 35 to split the beam into different diffraction orders. The fourth optical element 35, in one embodiment, can comprise, for example, a Dammann grating, a DOE, a HOE, or other optical component.

In one embodiment of the MAT, after the flat top beam passes through the large spherical lens 33 and is collimated, it feeds into a second DOE 35 that uniformly redistributes the flattened beam into several orders of diffraction 12g, with each order having equal intensity. This implies each order of diffraction will also have a flat top intensity distribution. Using the second DOE 35, multiple beams are produced. In the far field, the separation between the diffracted beams from N orders, Δx, is inversely proportional to the grating period, d.

The product of the diffraction orders from the two gratings results in a transmission matrix, with N×N diffracted beams 12g with uniform intensity. The separation into multiple beams with flat top intensity distribution allows each diffracted order to be directed, after amplification, to multiple customers with a single transmitter. Here, the separation between the customers' premises, taking into cognizance the divergence and range of the CPE, is approximated by the separation between the diffracted orders. The diffracted beam separation at the customer premises is proportional to the grating groove separation in one embodiment.

Figure 4B:
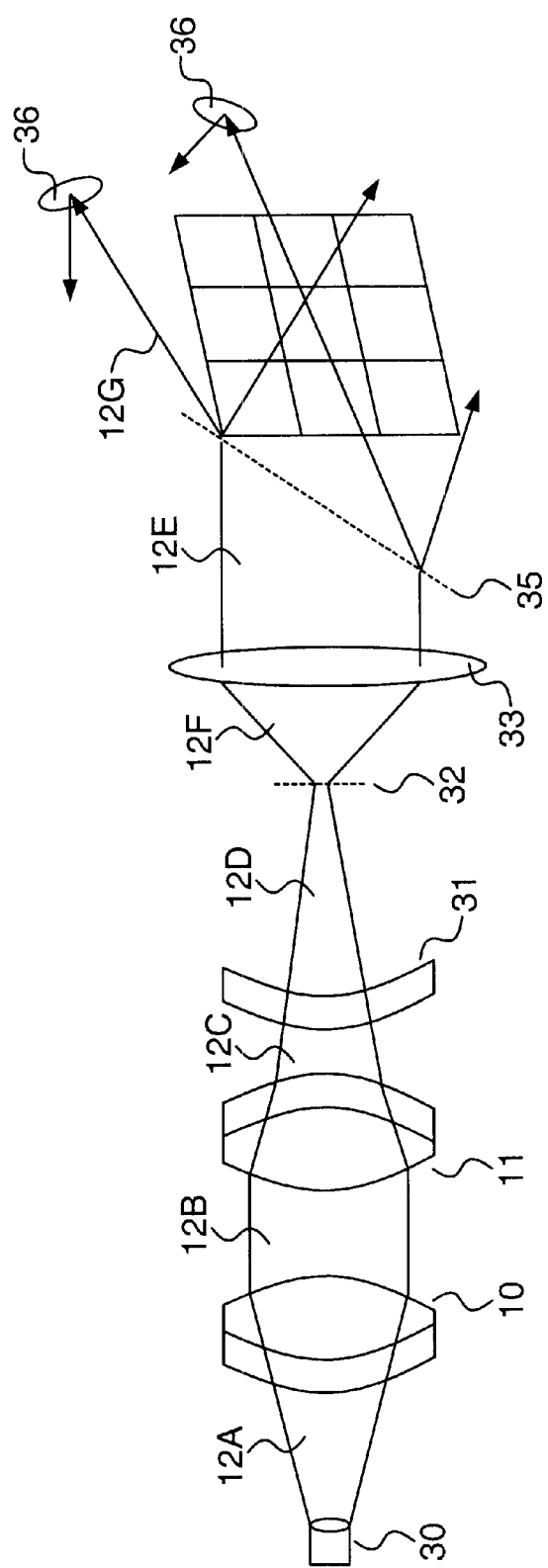
FIG. 4B illustrates a schematic diagram of a transmitter of individual flat-top intensity beam elements to specific locations according to another embodiment of the present invention.

FIG. 4B is an illustration of the MAT in a dynamic configuration embodiment, where the separation between the CPE and transmitter varies. In this scenario, more control can be provided if it is needed over directing the beams to their destinations. In one embodiment, the fourth optical element 35 can further comprise (or be optically coupled to) a steering element 36 to direct each beam if required. That is, if more control is needed to direct the beams, the steering element 36, such as a steering mirror, can be added after the fourth optical element 35 to direct each diffracted order 12g to any desired customer as shown in FIG. 4B.

Figure 5:
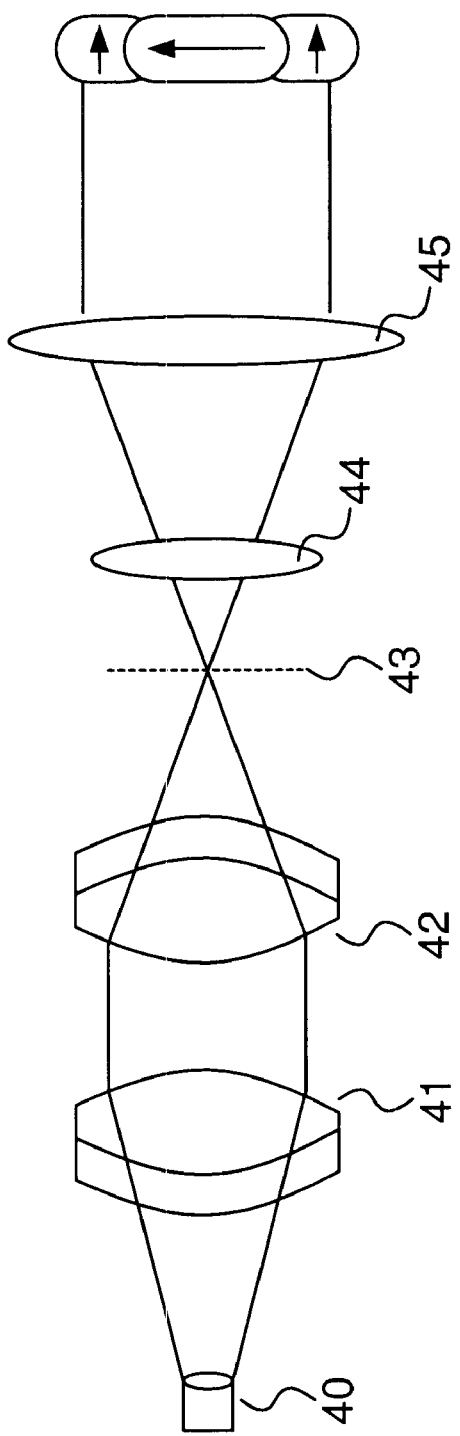
FIG. 5 illustrates a schematic diagram of a uniform intensity flat-top beam generator according to one embodiment of the present invention.

FIG. 5 illustrates a schematic diagram of another embodiment of the present invention. FIG. 5 contains a light source 40, a first optical element 41, a second optical element 42, a DOE 43, a cross polarizer 44 and a large spherical lens 45.

A light beam from the light source 40 passes through the first optical element 41. After passing through the first optical element 42, the light beam then feeds into the second optical element 43. The light beam after passing through the second optical element 44 is then fed into the DOE 43, through the cross polarizer 45, and then passes through the large spherical lens 44.

More specifically, the light beam from the light source 40 is fed into the first and second optical elements 41, 42 which can be two counter oriented plano-convex lenses in one embodiment. The first optical element 41 collimates the light beam from the light source 40. The second optical element 42 focuses the collimated light beam and images it to a spot size. The focused light beam feeds into the DOE 43. The DOE 43 can be a 1×3 row vector grating as an example embodiment and can be placed at the confocal distance of the combined focal length of the first and second optical elements 41, 42. The DOE 43 scatters the focused light beam into three, diffraction orders in a cone of about 38 degrees, as an example. The angular separation of the first-order beams from the zeroth order is about 19 degrees, as an example. The scattered beams then pass through a cross polarizer 45. The cross polarizer 45 is made up of two cross polarizers which are cut in half, and one-half of each was glued to the other. The cross polarizer 45 when placed in front of the DOE 43 creates non-overlapping beams of different polarization in the far field, which eliminates any fringes. The scattered beams are incident onto the large spherical lens 44, which collimates the three beams into the far field. The beams when collimated in the far field generates a uniform intensity flat-top beam.

As can be seen in light of the recent disclosure, the elements used in the optical path are not required to be of a specific type. In any of the above embodiments, the elements in the path can be replaced with, but not limited to, a lens, a diffractive optical element, a holographic optical element, or Dammann grating that perform the same function.

The above description of illustrated embodiments of the invention, including what is described in the Abstract, is not intended to be exhaustive or to limit the invention to the precise forms disclosed. While specific embodiments of, and examples for, the invention are described herein for illustrative purposes, various equivalent modifications are possible within the scope of the invention, as those skilled in the relevant art will recognize.

These modifications can be made to the invention in light of the above detailed description. The terms used in the following claims should not be construed to limit the invention to the specific embodiments disclosed in the specification and the claims. Rather, the scope of the invention is to be determined entirely by the following claims, which are to be construed in accordance with established doctrines of claim interpretation.

What is claimed is:

1. An apparatus comprising:
   a first optical element to create a uniform intensity flat-top beam placed in a path of an optical beam; and
   a second optical element to cancel a divergence and to correct a phase of the optical beam after it passes through the first optical element.

2. The apparatus of claim 1, wherein the first and second optical elements comprise a pair of lenses structured to match a phase modulo function.

3. The apparatus of claim 1, wherein the first and second optical elements comprise a pair of achromatic doublets lenses structured to match a phase modulo function.

4. The apparatus of claim 1, further comprising:
   a third optical element to expand the optical beam, placed in the path of the optical beam after the divergence and phase have been corrected; and
   a collimating lens, placed in the path of the optical beam after expansion by the third optical element, to collimate an expanded optical beam.

5. The apparatus of claim 4, wherein the third optical element comprises a lens.

6. The apparatus of claim 4, wherein the third optical element comprises a diffractive optical element.

7. The apparatus of claim 4, wherein the third optical element comprises a holographic optical element.

8. The apparatus of claim 4, further comprising a fourth optical element to split the optical beam into beam elements with separate diffraction orders, placed in the path of the optical beam after the optical beam has been collimated by the collimating lens.

9. The apparatus of claim 8, wherein the fourth optical element comprises a Dammann grating.

10. The apparatus of claim 8, wherein the third optical element comprises a diffractive optical element.

11. The apparatus of claim 8, wherein the third optical element comprises a holographic optical element.

12. The apparatus of claim 8, further comprising a steering element to direct one of the beam elements to a specific location, placed in a path of that beam element.

13. The apparatus of claim 12, wherein the steering element comprises a steering mirror.

14. The apparatus of claim 1, further comprising a light source to provide the optical beam.

15. The apparatus of claim 14, wherein the light source comprises a fiber cable interface.

16. The apparatus of claim 14, wherein the light source comprises an erbium doped fiber amplifier.

17. The apparatus of claim 14, wherein the light source comprises a laser.

18. The apparatus of claim 14, wherein the light source comprises a laser and a beam expander.

19. An apparatus comprising:
   a first optical element to collimate a light beam from a light source;
   a second optical element to focus the collimated light beam from the first optical element;
   a diffractive optical element to scatter the focused light beam into a plurality of diffraction orders in a cone and having an angular separation between the diffraction orders;
   a cross polarizer to correct the scattered light beam to eliminate any fringes in a far-field; and
   a spherical lens to collimate the corrected light beam into the far-field to produce a uniform intensity flat-top beam.

20. The apparatus of claim 19, wherein the first and second optical elements comprise two counter oriented plano-convex lenses.

21. The apparatus of claim 19, wherein the diffractive optical element comprises a vector grating.

22. The apparatus of claim 19, wherein the cross polarizer comprises an achromatic depolarizer.

23. A method, comprising:
   creating a uniform intensity flat-top beam from a non-uniform intensity optical beam; and
   canceling a divergence and correcting a phase of the created uniform intensity flat-top beam.

24. The method of claim 23, further comprising:
   expanding the optical beam after the divergence and phase have been corrected; and
   collimating the expanded beam.

25. The method of claim 24, further comprising splitting the collimated beam into beam elements with separate diffraction orders.

26. The method of claim 25, further comprising steering one of the beam elements to a specific location.

27. The method of claim 23, further comprising generating the non-uniform optical beam to be converted into the uniform intensity flat-top beam.

28. A system, comprising:
   a light source to generate a nonuniform intensity optical signal;
   an apparatus coupled to the light source, the apparatus including a first optical element to transform the non-uniform intensity optical signal to a uniform intensity flat-top beam and including a second optical element to correct a phase of the uniform intensity flat-top beam after it passes through the first optical element; and
   at least one receiver located in a far-field to receive the uniform intensity flat-top beam after it passes through the second optical element.

29. The system of claim 28 wherein the second optical element is structured to cancel a divergence of the uniform intensity flat-top beam.

30. The system of claim 28 wherein the apparatus further comprises:
   another optical element positioned in front of the second optical element to split the uniform intensity flat top beam into a plurality of uniform intensity flat-top beams; and
   a steering element to direct each of the plurality of uniform intensity flat-top beams to a corresponding plurality of receivers.

* * * * *

UNITED STATES PATENT AND TRADEMARK OFFICE
CERTIFICATE OF CORRECTION

PATENT NO. : 6,487,022 B1
DATED : November 26, 2002
INVENTOR(S) : Okorogu

It is certified that error appears in the above-identified patent and that said Letters Patent is hereby corrected as shown below:

<u>Title page,</u>
Item [56], References Cited, U.S. PATENT DOCUMENTS, please delete "4,530,564" and insert -- 4,530,574 --.

Signed and Sealed this

Twenty-second Day of June, 2004

JON W. DUDAS
*Acting Director of the United States Patent and Trademark Office*